(12) United States Patent　(10) Patent No.:　US 12,613,401 B2

Huhse et al.　(45) Date of Patent:　Apr. 28, 2026

(54) MICROSCOPY METHOD, ESPECIALLY FOR FLUORESCENCE CORRELATION SPECTROSCOPY

(71) Applicant: Carl Zeiss Microscopy GmbH, Jena (DE)

(72) Inventors: Dieter Huhse, Jena (DE); Stanislav Kalinin, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 173 days.

(21) Appl. No.: 18/451,955

(22) Filed: Aug. 18, 2023

(65) Prior Publication Data

US 2024/0061227 A1　Feb. 22, 2024

(30) Foreign Application Priority Data

Aug. 19, 2022　(DE) ..................... 10 2022 208 620.1

(51) Int. Cl.
G02B 21/00　(2006.01)

(52) U.S. Cl.
CPC ....... G02B 21/008 (2013.01); G02B 21/0064 (2013.01)

(58) Field of Classification Search
CPC ...... G02B 21/16; G02B 21/26; G02B 21/367; G02B 21/008; G02B 21/0064;

(Continued)

(56) References Cited

U.S. PATENT DOCUMENTS 8,704,196 B2　4/2014　Wolleschensky et al.
2006/0133657 A1*　6/2006　Schmid .................. G02B 21/26
382/128

(Continued)

FOREIGN PATENT DOCUMENTS

EP　3 206 070　8/2017

OTHER PUBLICATIONS

Berglund et al., "Tracking-FCS: Fluorescence correlation spectroscopy of individual particles", Optics Express, vol. 13, No. 20, Oct. 3, 2005, pp. 8069-8082.

(Continued)

*Primary Examiner* — Thomas K Pham
(74) *Attorney, Agent, or Firm* — Grüneberg Global IP, PLLC

(57)　ABSTRACT

A microscopy method involves directing a focused beam of excitation radiation at an examination location of an object to be examined, to create an excitation volume in the object. An overview image is used to identify at least one structure of the object and define at least one of the identified structures as a reference structure. A spatial relationship is defined between the positions of the examination location and the reference structure. Detection radiation coming from the excitation volume is acquired as measurement values over an overall measurement duration, the overall measurement duration being subdivided into a plurality of measurement intervals. At least every second measurement interval is preceded by a comparison of the current position of the focused beam with a current position of the examination location. The positioning of the focused beam is corrected in the case of an inadmissible deviation of the current positions.

20 Claims, 3 Drawing Sheets

Fig. 2

(58) Field of Classification Search
   CPC .......... G01N 21/64; G01J 3/00; G01J 3/0256;
                              G01J 3/0259; G01J 3/0272
   See application file for complete search history.

(56)                    References Cited

U.S. PATENT DOCUMENTS

| | | | |
|---|---|---|---|
| 2008/0182336 A1* | 7/2008 | Zhuang | G01N 15/1429 |
| | | | 436/172 |
| 2013/0027518 A1* | 1/2013 | MacKay | G02B 21/367 |
| | | | 348/46 |
| 2016/0267658 A1* | 9/2016 | Kleppe | G06T 7/97 |

OTHER PUBLICATIONS

McGorty et al., "Active microscope stabilization in three dimensions using image correlation", Optical Nanoscopy, vol. 2, No. 3, 2013, pp. 1-7.
Scipioni et al., "Comprehensive correlation analysis for super-resolution dynamic fingerprinting of cellular compartments using the Zeiss Airyscan detector", Nature Communications, 2018, vol. 9, 5120, DOI:10.1038/s41467-018-07513-2, pp. 1-7.

* cited by examiner

MICROSCOPY METHOD, ESPECIALLY FOR FLUORESCENCE CORRELATION SPECTROSCOPY

CROSS-REFERENCE TO RELATED APPLICATIONS

This application claims priority to German Application No. 102022208620.1 filed on Aug. 19, 2022, the content of which is hereby incorporated by reference in its entirety.

BACKGROUND OF THE INVENTION

Field of the Invention

The invention relates to a microscopy method which can be used, in particular, in the field of fluorescence correlation spectroscopy.

Description of Related Art

Fluorescence correlation spectroscopy (FCS) is a method in the field of confocal scanning microscopy, especially confocal laser scanning microscopy, which has proven its worth, for example for examining the dynamics of the behavior of molecules in cells.

By way of example, when a laser scanning microscope (LSM) is used, it is possible to determine the diffusion of a fluorescence-marked molecule or an autofluorescing molecule into and out of the confocal volume of the LSM. A confocal volume, also referred to as excitation volume hereinbelow, is created in cooperation with what is known as a pinhole, by virtue of a beam of excitation radiation being focused and directed at an object to be examined. In this case, the excitation volume has an extent around the optical axis along which the excitation radiation is radiated in (illumination axis). Moreover the excitation volume has a respective extent along a certain path along the optical axis (Z-direction; direction of the z-axis).

Movements and an optical behavior of fluorescing molecules located in or passing through the excitation volume are detected and evaluated within the scope of fluorescence correlation spectroscopy. In this case, the position of the excitation volume (examination location) is kept constant relative to the sample over the entire time period of an FCS measurement.

However, typical FCS measurements take several seconds, sometimes even minutes. Since FCS measurements are usually performed on living samples, the sample, or the structures in the sample to be examined, may move during the FCS measurement and hence migrate out of the excitation volume. The observed movement of a fluorescing molecule is then caused not only by an actual diffusion motion of this molecule but additionally falsified by an inadvertent displacement of the sample. As a consequence of such a displacement, the position of the excitation volume has thus undesirably been changed relative to the sample. Such displacements may be very bothersome in certain configurations of the FCS method. By way of example, FCS measurement values are thus potentially influenced significantly within the scope of what is known as an airy scan FCS, for example if a membrane should be measured exactly at a surface or if a measurement should be carried out in a channel (L. Scipioni, L. Lanzanó, A. Diaspro & E. Gratton, 2018; "Comprehensive correlation analysis for superresolution dynamic fingerprinting of cellular compartments using the Zeiss Airyscan detector", NATURE COMMUNICATIONS 9: 5120).

SUMMARY OF THE INVENTION

It is an object of the invention to specify a possibility for effective correcting of displacements that arise between excitation radiation and a desired examination location.

The object is achieved by the subject matter as described below. Advantageous developments are also described in the subject matter below.

The object is solved by a microscopy method in which a focused beam of excitation radiation is directed at an examination location of an object to be examined, an excitation volume being created in the object. The examination location is determined by the pose of the excitation volume in the object. For simplification purposes, an assumption can be made that the location of incidence of excitation radiation on the object can be considered to be the examination location in the case of the excitation radiation being directed at the object in substantially perpendicular fashion.

The object is a biological sample in particular, for example a cell or a tissue. The object can also be a sol, a gel, a suspension, a solution or a body sufficiently transparent to the excitation radiation and the fluorescence radiation.

At least one structure of the object is identified on the basis of at least one overview image captured along an image capture axis. At least one of the identified structures is defined as a reference structure. The overview image preferably extends orthogonal to the image capture axis. In further embodiments of the invention, the overview image may extend at an angle not equal to 90° with respect to the image capture axis, especially if the image capture axis is directed at the object at an acute angle. The overview image may be captured using a camera present in addition to a detection objective or to a common illumination and detection objective. In further embodiments of the invention, the overview image may be captured by means of the detector which also serves for the acquisition of the measurement values, in particular FCS measurement values (see below). Thus, the overview image may be captured by means of the detector of a scanning microscope, in particular by means of the detector of a laser scanning microscope (LSM). In the latter embodiment, the image capture axis coincides with an optical axis of the objective used for the detection. A further possible embodiment of the invention uses the detection beam path of the scanning microscope, but uses a further detector to capture an overview image. To this end, the detected radiation can be selectively steered to the further detector for the purpose of capturing the overview image.

In this case, the at least one reference structure is, for example, a portion of a cell membrane or cell wall, of a holding and support structure such as collagen fibers or a portion of cell organelles such as the endoplasmic reticulum, of mitochondria, chloroplasts or vacuoles. The invention is, in contrast to prior art, directed to the use of already existing structures of the sample as reference structures. Objects technologically/artificially/intentionally added to either the sample or a sample carrier are not used as reference structures. Preferably, those structures for which no change or only a negligible change of their position in relation to the examination location is expected during a sought overall measurement duration of the method are selected as reference structures.

By way of example, a reference point is selected and defined by the reference structure. A geometric centroid of the reference structure may also be determined. A plurality of reference points and/or centroids of different reference structures can be defined in order to improve the accuracy of the check of the position. Such a procedure allows a check of the plausibility of a plurality of results for a spatial relationship (see below) among themselves. Additionally, it is then possible in each case to take account of only those reference points or centroids which can be clearly determined or whose results are plausible. For example, a clear determination of the reference point can be made more difficult or prevented as a consequence of a disadvantageous relative pose of the reference structure during the capture of one of the overview images.

The examination location can be defined on the basis of the overview image. It is also possible to select the examination location and only then seek for a suitable reference structure in the surround of the examination location.

The definition of the examination location can be implemented manually by a user of the method according to the invention. However, this is advantageously implemented by means of known image evaluation methods and/or by applying image evaluation methods on the basis of machine learning and/or artificial intelligence.

The image capture axis and an illumination axis are advantageously aligned parallel to one another and advantageously have no lateral offset or only a small lateral offset from one another. This requires less computational capacity for the purpose of relating the information items acquired along each of the two axes to one another.

A spatial relationship is defined between the position of the examination location and the reference point or the centroid of the reference structure. Hereinafter, reference is made to a reference structure, for the sake of simplicity. By way of example, such a relationship can be defined and stored in the form of a calculation rule or a specification of positions in a coordinate system and the deviation thereof from one another (distances and directions; vectors). Using this method step, it is possible at all times to determine, more particularly calculate, a target position of the examination location on the basis of a current position of the reference structure.

Accordingly, a plurality of spatial relationships are defined if a plurality of reference structures were selected. The method may comprise a plausibility check for the results of the calculations in relation to the spatial relationship. By way of example, when a plurality of reference structures are taken into account, said plausibility check can be used to check whether the results are consistent or whether for example a single result deviates from the other results by more than what is admissible. In such a case, the significantly deviating result can be discarded, for example.

If molecules that are excitable to emit fluorescence radiation are present within the excitation volume, then these molecules are excited by the effect of the excitation radiation in the excitation volume to emit fluorescence radiation, the latter subsequently being detected as the detection radiation and being stored in the form of measurement values.

The overall measurement duration provided for an acquisition of measurement values within the scope of the method according to the invention is subdivided into a plurality of measurement intervals. Thus, measurement values are acquired at least in two measurement intervals within the scope of the method being carried out.

The current position of the focused beam is compared to a current position of the examination location at least prior to every second measurement interval, but preferably prior to each measurement interval. This is implemented by virtue of a current position of the reference structure being determined and the current position of the examination location being determined on the basis of the spatial relationship. In this way, it is possible to compare a current actual position of the examination location, which is defined by way of its relative pose with respect to the selected reference structure, with the current actual position of the focused beam. The positioning of the focused beam is corrected if an inadmissible deviation is determined between the current positions of the focused beam and the examination location. In the process, generally known algorithms such as the cross correlation, for example, can be used to determine the deviations and the required correction movements.

The method according to the invention may optionally comprise further steps.

The core of the invention lies in a procedure which can be used, firstly, to acquire and evaluate measurement values over sufficiently long time periods but, secondly, allows a regular check and optional correction of the positionings of a focused beam of the excitation radiation, that is to say of the excitation volume as a result, in view of the desired examination location.

In contrast to known methods of "single particle tracking" (e.g., Andrew J. Berglund and Hideo Mabuchi, 2005; "Tracking-FCS: Fluorescence correlation spectroscopy of individual particles", Optics Express Vol. 13, Issue 20, pp. 8069-8082; https://doi.org/10.1364/OPEX.13.008069), it is not the trajectory of a single fluorescent molecule that is followed; instead, at least one reference structure that should not be measured is used to keep the beam of the focused excitation radiation constant relative to the reference structure. Then, any molecules which are optionally excited to emit fluorescence radiation but are not tracked any further once they have left the excitation volume are able to diffuse through the excitation volume.

The measurement values are acquired over a plurality of measurement intervals when a microscopy method according to the invention is carried out, with each of the measurement intervals having a duration of at least 0.5 seconds. An advantageous relationship between the durations of the measurement value acquisition and a frequency of the control intervals for the current positionings is achieved by way of a duration of the measurement intervals of at least 0.5 seconds, advantageously of one second, for an overall measurement duration of ten seconds for example. In a further advantageous configuration of the invention, measurement intervals of ten seconds each are used in the case of an overall measurement duration of 100 seconds.

In order to perform the comparison of the current position of the focused beam with the current position of the examination location prior to each of the measurement intervals, at least one overview image of the object is recorded in an advantageous configuration of the method. The overview image advantageously extends orthogonal to the image capture axis. However, a capture can also be implemented at a capture angle of not equal to 90°, which requires an increased computational outlay for the evaluation of the overview image. These overview images may optionally cover a smaller object field around the image capture axis than the overview image used to identify the structures.

The overview image that was also used for the identification of the structures can be used for the comparison of the positions prior to the first measurement interval.

The overview images can be wide-field images or images that were captured by means of an LSM. Depending on the optical properties of the object, it is possible to use imaging methods such as contrast methods, fluorescence imaging or just laser scanning microscopy.

A possible deviation of the positions of a focused beam of the excitation radiation and an examination location can be determined using an overview image which, in particular, extends substantially in an x-y-plane of a Cartesian coordinate system. To also allow a correction in the Z-direction, the comparison of the current position of the focused beam with the current position of the examination location can be performed on the basis of a stack of overview images in a further advantageous configuration of the method according to the invention, with the overview images extending orthogonal to the image capture axis and being stacked along the image capture axis, that is to say in the direction of the z-axis. To limit the time required for the check of the position, such a stack (Z-stack) may contain only three to five overview images in different planes, for example. Such Z-stacks can also be used to identify and define the structures or the at least one reference structure.

In order to obtain a reliable reproducibility of decisions with regard to the identification and selection of the structures and with regard to the definition of the reference structure(s) and/or the selection and definition of the examination location, these method steps may be automated either on an individual basis or as a whole. To this end, the aforementioned procedures can be carried out by means of known image evaluation methods, wherein the decisions made can advantageously be tracked and verified on the basis of adjustable and documented parameters.

In addition or as an alternative, it is possible to apply image evaluation methods based on machine learning and/or artificial intelligence, in order to perform some or all procedures for identification, selection and definition.

Unlike in the prior art, measurement values of a complete measurement procedure are acquired at intervals and the positions are repeatedly checked and optionally corrected by means of the method according to the invention. The measurement values acquired during the measurement intervals can be evaluated in different ways after the overall measurement duration of the measurement procedure has elapsed. Firstly, it is possible to average or summate the measurement values from the measurement intervals. Secondly, the measurement values from the individual measurement intervals can be strung together to form a common measurement interval and an evaluation can be carried out over the entire duration of the summated measurement intervals. Additionally, it is possible to evaluate the measurement values from the individual measurement intervals separately, with these being fitted to mathematical models, for example. The results determined in the process, in particular the factors and/or terms ("fit parameters") used for fitting to the models, can subsequently be averaged.

A selection of measurement intervals used to carry out the evaluation can be made for all types of evaluation. Thus, all or only some of the measurement intervals may be selected and considered.

The microscopy method according to the invention can be used particularly advantageously in the configuration as a fluorescence correlation spectroscopy method (FCS method).

To carry out the method, use can be made of a microscope or an optical device which, in particular, is used for fluorescence correlation spectroscopy. In addition to the required optical elements and beam paths, such a device comprises a control unit configured to carry out the method according to the invention. In an excitation beam path, the microscope according to the invention moreover comprises a scanning device and/or a controllably displaceable sample stage for aligning a relative pose of focused beam and an object to be examined.

By way of example, the control unit can be a PC, an FPGA, a CPU or a microcontroller. In this case, the control unit receives the measurement values acquired during the measurement intervals and stores these measurement values. It is moreover configured to identify the structures and optionally to select the reference structure, to determine the spatial relationship and optionally to calculate the current positions. The control unit produces control commands on the basis of the determined positions of a focused beam and examination location. These are transmitted to drives of at least one scanning device in the excitation beam path and/or of a sample stage. As a consequence of executing the control commands, the positionings of beam and examination location are corrected when required.

A detector for capturing an overview image of an object to be examined and a detector for detecting fluorescence radiation are arranged in a detection beam path. The fluorescence radiation to be detected is excited in the object, and emitted by the latter, as a result of the effect of the excitation radiation.

An additional camera for capturing the overview image may be present in further embodiments of the device.

The invention also includes the following embodiments:

1. A microscopy method, wherein
   a focused beam of excitation radiation (AS) is directed at an examination location (17) of an object (7) to be examined, an excitation volume being created in the object (7);
   at least one structure (15) of the object (7) is identified on the basis of an overview image and at least one of the identified structures (15) is defined as a reference structure (16);
   a spatial relationship is defined between the positions of the examination location (17) and the reference structure (16);
   detection radiation (DS) coming from the excitation volume is acquired as measurement values over an overall measurement duration;
   the overall measurement duration is subdivided into a plurality of measurement intervals;
   at least every second measurement interval is preceded by
   a comparison of the current position of the focused beam with a current position of the examination location (17) by virtue of a current position of the reference structure (16) being determined and the current position of the examination location (17) being determined on the basis of the spatial relationship;
   a correction of the positioning of the focused beam in the case of an inadmissible deviation between the current positions of the focused beam and the examination location (17).

2. The microscopy method as claimed in embodiment 1, wherein each of the measurement intervals has a duration of at least 0.5 seconds.

3. The microscopy method as claimed in embodiment 1, wherein each of the measurement intervals has a duration of at least one second.

4. The microscopy method as claimed in any of the preceding embodiments, wherein the identification of structures (15) of the object (7) and, optionally, the definition of the reference structure (16) is/are implemented in automated fashion by means of an image evaluation method.

5. The microscopy method as claimed in any of the preceding embodiments, wherein the comparison of the current position of the focused beam with the current position of the examination location (17) is performed on the basis of an overview image.

6. The microscopy method as claimed in any of the preceding embodiments, wherein the comparison of the current position of the focused beam with the current position of the examination location (17) is performed on the basis of a stack of overview images, the overview images extending orthogonal to an image capture axis (BeA) and being stacked along the image capture axis (BeA).

7. The microscopy method as claimed in any of the preceding embodiments, wherein a mean value of the measurement values is calculated by way of a selection of the measurement intervals of an overall measurement duration.

8. The microscopy method as claimed in any of embodiments 1 to 6, wherein the measurement values of a selection of the measurement intervals of an overall measurement duration are combined to form a common measurement interval and evaluated.

9. The microscopy method as claimed in any of the preceding embodiments, wherein the latter is designed as a fluorescence correlation spectroscopy method (FCS method), more particularly as an airy scan FCS.

10. A microscope (M) comprising
in an excitation beam path (2):
   a light source (1) for providing excitation radiation (AS);
   optical elements (6) for creating a focused beam of the excitation radiation (AS);
   a scanning device (5) and/or a controllably displaceable sample stage (8) for aligning a relative pose of focused beam of the excitation radiation (AS) and an object (7) to be examined;
in a detection beam path (9):
   either
   a detector (12) for detecting detection radiation (DS), which is excited in the object (7) and emitted by the latter as a result of the effect of the excitation radiation (AS), and for capturing an overview image of the object (7);
   or
   a detector (12) for detecting detection radiation (DS), which is excited in the object (7) and emitted by the latter as a result of the effect of the excitation radiation (AS), and
   a camera (14) for capturing an overview image of the object (7);
and
   a control unit (11) configured to carry out the method as claimed in any of embodiments 1 to 9.

BRIEF DESCRIPTION OF THE DRAWINGS

The invention is explained in more detail below on the basis of exemplary embodiments and drawings, in which.

DETAILED DESCRIPTION OF THE INVENTION

The drawings are much simplified and are restricted in the illustration to the technical elements required for the explanation. The beam paths have likewise been shown in much simplified fashion.

Figures 1, 2:
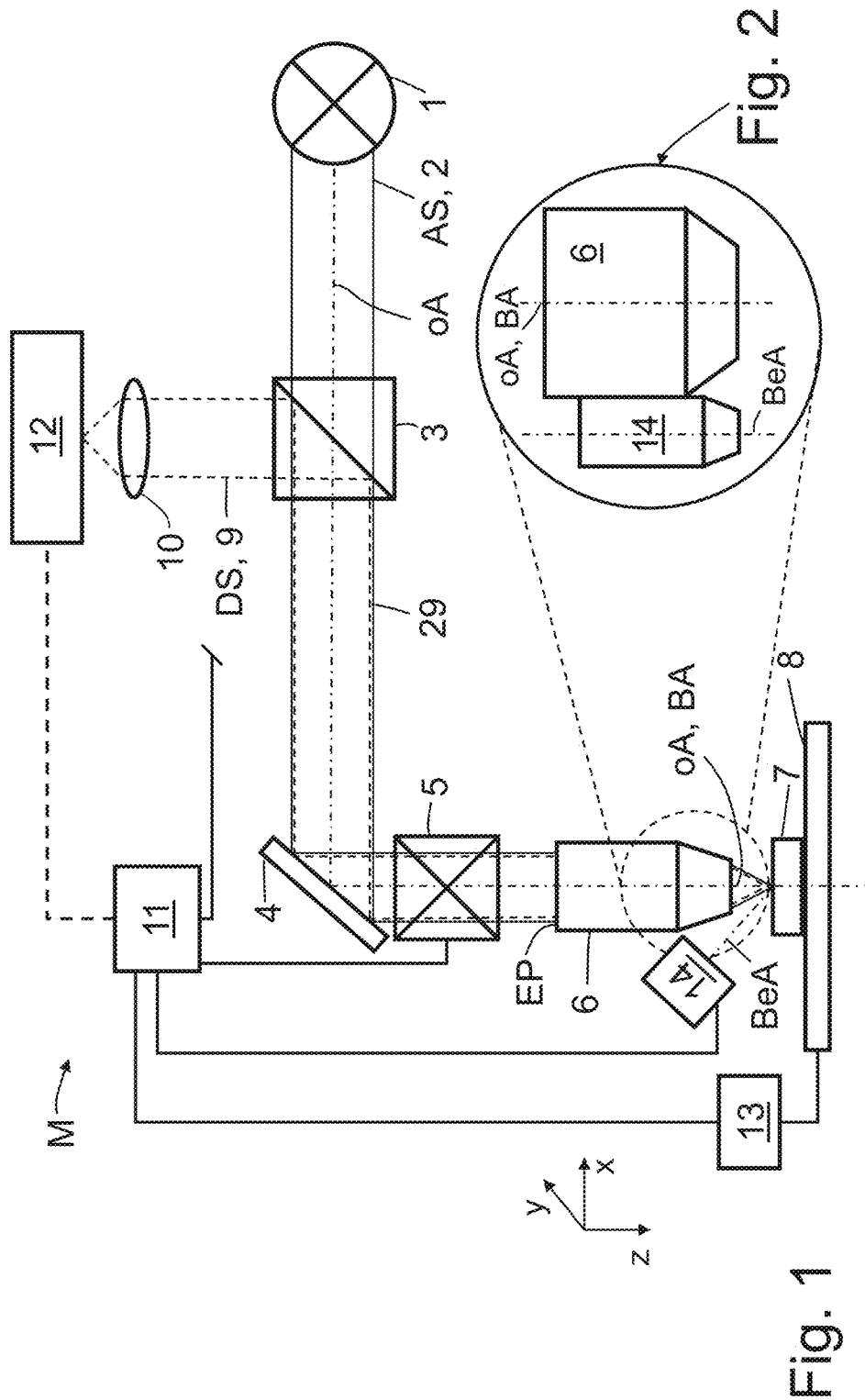
FIG. 1 shows a schematic illustration of a first exemplary embodiment of a microscope according to the invention.
FIG. 2 shows an enlarged image detail of objective and camera according to a second exemplary embodiment of the microscope according to the invention.

An exemplary embodiment of a device, in particular a microscope M, comprises a light source 1, for example a laser light source, from where a beam of excitation radiation AS is emitted and guided along an excitation beam path 2 (FIG. 1). Optionally present optical elements for shaping and/or collimating the excitation radiation AS have not been illustrated.

The excitation radiation AS is incident on a main color splitter 3, which is transmissive in relation to the excitation radiation AS and allows the latter to pass. Downstream of the main color splitter 3, the excitation radiation AS passes through a portion of the beam path of the device which is referred to as the joint beam path 29 and along which the excitation radiation AS and detection radiation DS (see below) are jointly guided or can be jointly guided.

By means of a scanner 5 arranged downstream thereof, it is possible to controllably deflect the beam of the excitation radiation AS previously deflected by means of a mirror 4 and direct said beam into the entrance pupil EP of an objective 6. The mirror 4 allows a compact structure and may be omitted in further embodiments of the device if a deflection of the excitation beam path 2 is not required or not provided.

The excitation radiation AS controllably deflected by means of the scanner 5 is focused under the action of the objective 6 into a sample space, in which an object 7 to be examined (sample 7) may be present on a sample stage 8. The excitation radiation AS radiated in in focused fashion in this way brings about a confocal excitation volume (not illustrated) in the sample 7. Optionally, the sample stage 8 is controllably adjustable at least in the x-y-plane, optionally also in the direction of the Z-axis, by means of a drive 13.

Detection radiation DS caused in the confocal excitation volume in the sample 7 by way of the excitation radiation AS is captured by means of the objective 6 and guided along a detection beam path 9 (shown using dashed lines), which coincides with the excitation beam path 2 (joint beam path 29) up to the main color splitter 3.

In further embodiments of the device according to the invention, the detection radiation DS may be captured by means of a further objective (not shown). In such a case, the excitation beam path 2 and detection beam path 9 can be completely separate from one another or these beam paths are merged back together to form the joint beam path 29, for example by means of a further color splitter (not shown).

In the illustrated exemplary embodiment, the detection radiation DS is converted into a resting beam as a consequence of passing through the scanner 5 ("descanned") and reaches the main color splitter 3. The latter is reflective to the wavelength of the detection radiation DS, which differs from the wavelength of the excitation radiation AS. The detection radiation DS reflected at the main color splitter 3 reaches an optical unit 10 present in the detection beam path 9. Said optical unit directs the detection radiation DS at a detector 12. In further embodiments, the transmissivity and the reflectivity of the main color splitter 3 may also be implemented in reverse, with the result that the excitation radiation AS is reflected and the detection radiation DS is passed. The beam paths 2 and 9 should be designed accordingly in that case.

In further embodiments, a pinhole (not shown) in the form of a pinhole stop or a slotted stop may be disposed in an intermediate image plane upstream of the detector 12 in order to mask out-of-focus components of the detection radiation DS. If the detector 12 is also intended to be used to capture the overview image, the pinhole is advantageously adjustable in terms of its aperture, and/or said pinhole can be moved into the detection beam path 9 or removed from the detection beam path 9. In such an embodiment of the invention, the detector 12 can be a secondary electron multiplier (photomultiplier; PMT), for example.

In a further embodiment, the detector 12 can be an array of a number of individually readable detector elements, for example as is the case for an airy detector (see above) or a SPAD (single photon avalanche diode) array. Then, the detector 12 is arranged in an intermediate image plane, with the detector elements each acting as a pinhole. Advantageously, detector elements can optionally be switched together in order thus to adjust a size of a resultant pinhole. This configuration is suitable, in particular, for a design as an FCS method.

A camera 14 may be present so as to be able to capture and provide the overview images required for the method according to the invention, the image capture axis BeA of said camera being at a known angle with respect to the illumination axis BA (corresponding to the optical axis oA of the excitation beam path 2) and being directed at the sample 7. An inclined arrangement of the camera 14 is technically advantageous if little installation space is available and/or if the camera 14 has large dimensions.

If the camera 14 is dimensioned sufficiently small in relation to the objective 6, it is possible for the illumination axis BA and the image capture axis BeA to be aligned at a small angle of up to 25° with respect to one another or parallel to one another, as shown in exemplary fashion in the enlarged image detail in FIG. 2. The camera 14 can be dispensed with in further embodiments of the invention. In that case, the overview image is captured by means of the detector 12 and evaluated by means of an appropriately configured control unit 11. The optical axis oA and the image capture axis BeA coincide in such an embodiment. The camera 14 may also be arranged in the detection beam path 9 in further embodiments of the device, wherein the course of the detection beam path 9 is controllably changed between the detector 12 and camera 14 depending on the image to be captured.

The scanner 5, the drive 13, the camera 14, and optionally the light source 1 are suitably connected to the control unit 11, for interchanging data and control commands. By way of example, the control unit 11 is a computer or a suitable control circuit.

Optionally, the control unit 11 and the detector 12 can be interconnected, for example to allow the control unit 11 to generate control commands and/or validate these, on the basis of the detected brightness information from the detector 12. By way of example, these control commands serve to control the light source 1, the scanner 5 and/or the optional drive 13 of the sample stage 8.

Figure 3:
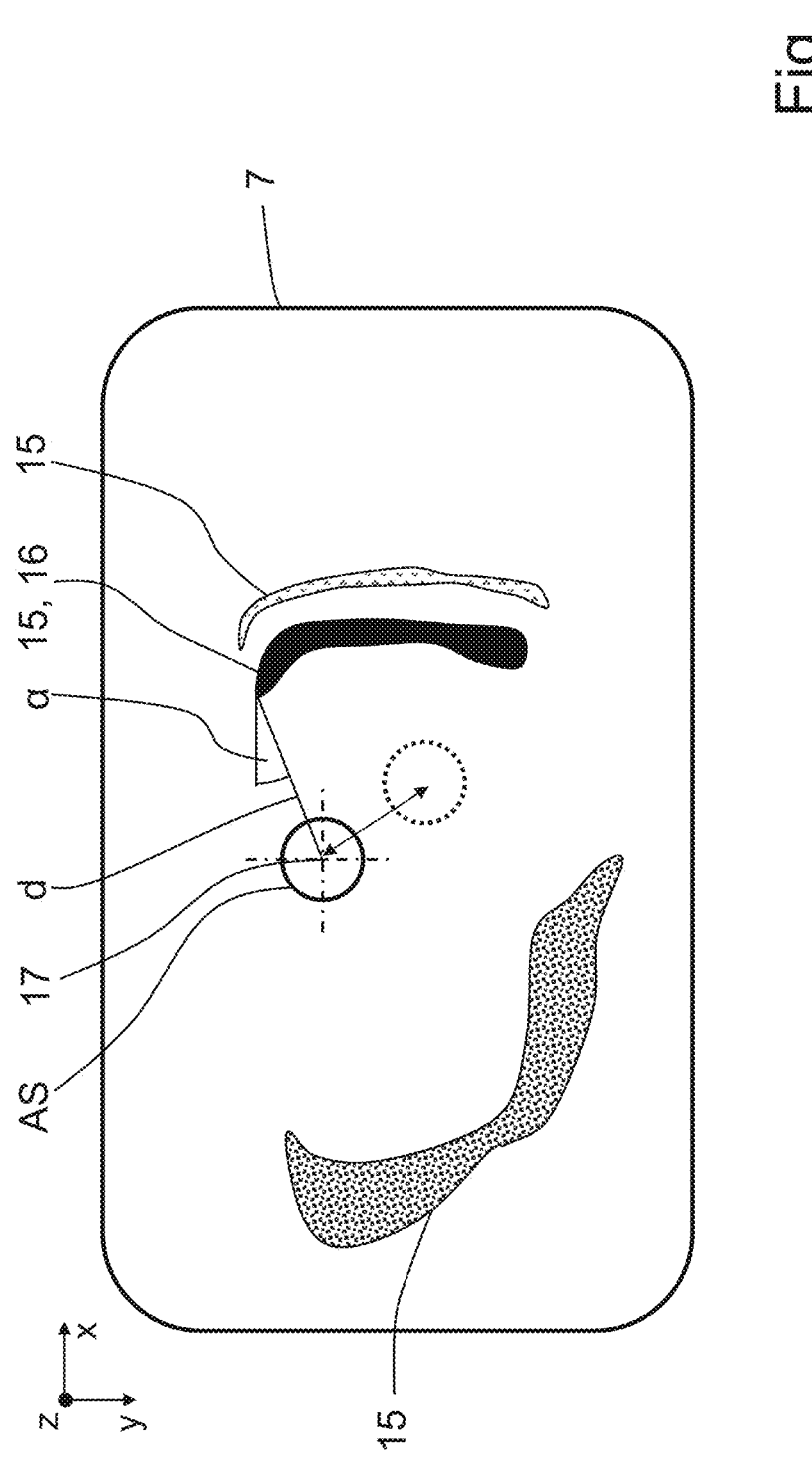
FIG. 3 shows a schematized illustration of an object to be examined and identified structures of the object and exemplary poses of an examination location in a plan view.
Figure 4:
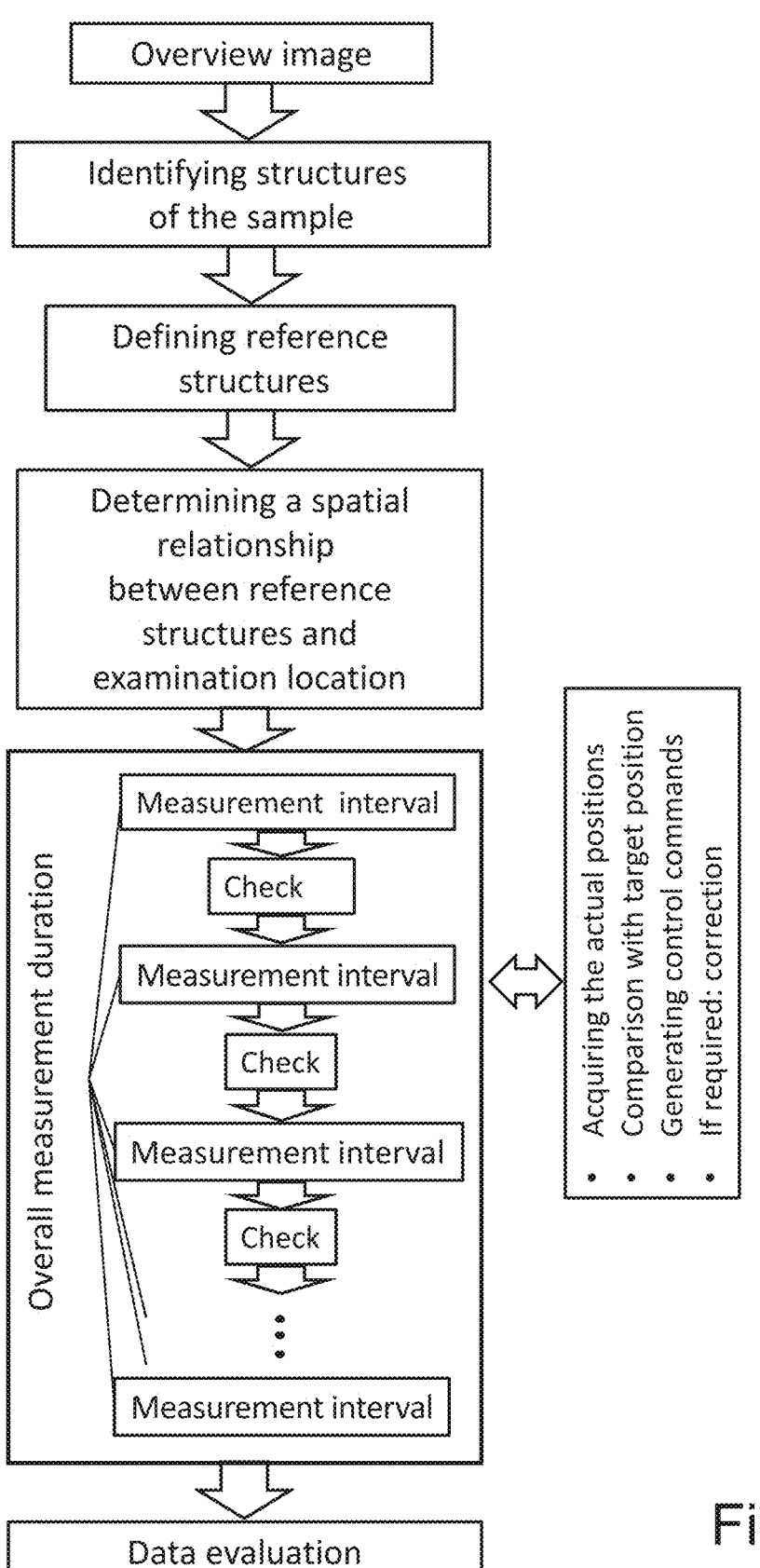
FIG. 4 shows a flowchart of a configuration of the method according to the invention.

FIGS. 3 and 4 visualize the principle of operation of the invention. FIG. 3 shows an overview image of a sample 7, for example a cell, along the illumination axis BA (see FIGS. 1 and 2). A number of structures 15 are identifiable on account of the different diffraction and refraction behavior of the various constituent parts of the sample 7. One of the structures 15 is selected as a reference structure 16 by applying predetermined criteria. A point thereof, for example a prominent location of the reference structure 16, is defined as a reference point, to which the angles and distances described below are related. Alternatively, the centroid of the reference structure 16 can be determined and used as a reference point.

An examination location 17, at which the measurement, more particularly an FCS measurement, should be implemented, is defined by the user or by means of an algorithm, for example on the basis of the overview image. A spatial relationship, for example given by an angle $\alpha$ (alpha) and a distance d, is determined between the reference structure 16 and the examination location 17.

The focused beam of the excitation radiation AS is directed at the examination location 17 and FCS measurement values are acquired and stored during the duration of a first measurement interval (see FIG. 4).

The excitation radiation AS is switched off or masked following the first measurement interval and a further overview image is captured. The latter may capture a smaller region of the sample 7 than the initially used overview image. The current positions (actual positions) of the reference structure 16 and of the examination location 17 are determined. The current position of the reference structure 16 can be determined from the newly captured overview image. Using the spatial relationship to the examination location 17, its current position can subsequently be determined. At the same time, the current alignment of the beam of the excitation radiation AS is known, for example on account of the deflection of the scanner 5 and/or the positioning of the sample stage 8. The FCS measurement is continued during the next measurement interval if the location of incidence of the excitation radiation AS and the examination location 17 correspond sufficiently, that is to say if their actual positions do not deviate from one another by more than an admissible tolerance measure and hence actual positions and target positions correspond.

By contrast, if the location of incidence of the excitation radiation AS and the examination location 17 deviate inadmissibly from one another, then the relative pose of the two with respect to one another is corrected. FIG. 3 shows, in exemplary fashion, excitation radiation AS (dashed line) which significantly deviates from the defined examination location 17. The control unit 11 is used to generate control commands, the execution of which accordingly aligns the scanner 5 and/or the sample stage 8 such that the excitation radiation AS strikes the examination location 17 again.

The described check and, if required, the correction of the positions of the examination location 17 and excitation radiation AS is carried out prior to each further measurement interval, until a previously defined number of measurement intervals have been run through or the procedure is terminated by a user.

The duration of the individual measurement intervals corresponds to an overall measurement duration of the FCS measurement. The measurement intervals can be strung together to form a joint measurement interval and can be evaluated as a time-connected sequence for a subsequent evaluation of the acquired FCS measurement values. It is also possible to select some of the measurement intervals for the evaluation. In a further method configuration, the FCS measurement values of the measurement intervals are averaged and the measurement interval with the averaged values obtained thus is evaluated. Further, measurement values of the measurement intervals can be fitted to mathematical models and the results obtained in the process can be used further, for example averaged.

REFERENCE SIGNS

1 Light source
2 Excitation beam path
3 Main color splitter
4 Mirror
5 Scanner
6 Objective
7 Sample
8 Sample stage
9 Detection beam path
10 Optical unit
11 Control unit
12 Detector
13 Drive (of the sample stage 8)
14 Camera
15 Structure
16 Reference structure
17 Examination location
29 Joint beam path
AS Excitation radiation
BA Illumination axis
BeA Image capture axis
DS Detection radiation
d Distance
EP Entrance pupil (of the objective 6)
M Microscope
oA Optical axis (of the detection beam path 9)
alpha Angle

The invention claimed is:

1. A method of operating a microscope system, comprising:

emitting excitation radiation from a light source along an excitation beam path;

directing and focusing the excitation radiation using a scanner and an objective to an examination location within a sample positioned on a sample stage:

acquiring, by a camera or detector, an overview image or image stack of the sample, the overview image or image stack including a reference structure;

identifying, by a control unit, the reference structure in the overview image or image stack;

defining, by the control unit, a spatial relationship between the reference structure and the examination location;

acquiring, by a detector, detection radiation emitted by the sample in response to the excitation radiation to produce measurement values over a measurement sequence;

subdividing, by the control unit, the measurement sequence into a plurality of measurement intervals;

before at least every second measurement interval:

determining, by the control unit, whether a deviation exists between a current position of the excitation radiation and the examination location, based on a current position of the reference structure; and in response to the deviation exceeding a threshold, realigning the excitation radiation with the examination location by controlling the scanner and/or the sample stage to correct for positional drift in three spatial dimensions.

2. The microscopy method as claimed in claim 1, wherein each of the measurement intervals has a duration of at least 0.5 seconds.

3. The microscopy method as claimed in claim 1, wherein each of the measurement intervals has a duration of at least one second.

4. The microscopy method as claimed in claim 1, wherein identifying the reference structure comprises automatically analyzing the overview image or image stack using an image evaluation algorithm executed by the control unit.

5. The microscopy method as claimed in claim 1, further comprising performing the deviation determination using the overview image acquired by the camera or detector.

6. The microscopy method as claimed in claim 1, wherein acquiring the overview image or image stack comprises acquiring a stack of images that extend orthogonal to an image capture axis and are stacked along the image capture axis.

7. The microscopy method as claimed in claim 1, further comprising calculating, by the control unit, a mean value of measurement values acquired during a selection of the measurement intervals.

8. The microscopy method as claimed in claim 1, further comprising combining, by the control unit, measurement values acquired during a selection of the measurement intervals into a common measurement interval and evaluating the combined values.

9. The microscopy method as claimed in claim 1, further comprising operating the microscope system in a fluorescence correlation spectroscopy mode.

10. The microscopy method as claimed in claim 9, wherein the fluorescence correlation spectroscopy mode is implemented as an Airy scan fluorescence correlation spectroscopy.

11. A microscope system, comprising:

a light source configured to emit excitation radiation along an excitation beam path;

optical elements including a scanner and an objective configured to direct and focus the excitation radiation at an examination location within a sample positioned on a sample stage:

a detection beam path including:

a detector configured to detect radiation emitted by the sample in response to the excitation radiation, and a camera or detector configured to capture an overview image or image stack of the sample, including a reference structure;

a control unit operatively connected to the scanner, the sample stage, the detector, and the camera or detector, the control unit being configured to:

identify the reference structure in the overview image or image stack;

define a spatial relationship between the reference structure and the examination location:

subdivide a measurement sequence into a plurality of measurement intervals;

before at least every second measurement interval:

determine whether a deviation exists between a current position of the excitation radiation and the examination location, based on a current position of the reference structure and the stored spatial relationship; and in response to the deviation exceeding a threshold, realign the excitation radiation with the examination location by controlling the scanner and/or the sample stage to correct for positional drift in three spatial dimensions.

12. The microscope system of claim 11, wherein each of the measurement intervals has a duration of at least 0.5 seconds.

13. The microscope system of claim 11, wherein each of the measurement intervals has a duration of at least one second.

14. The microscope system of claim 11, wherein the control unit is configured to identify the reference structure using an automated image evaluation method applied to the overview image or image stack.

15. The microscope system of claim 11, wherein the control unit is configured to perform the deviation comparison based on the overview image acquired by the camera or detector.

16. The microscope system of claim 11, wherein the overview image comprises a stack of images acquired by the camera or detector, the stack extending orthogonal to an image capture axis and being aligned along the image capture axis.

17. The microscope system of claim 11, wherein the control unit is further configured to calculate a mean value of measurement values acquired by the detector during a selection of the measurement intervals.

18. The microscope system of claim 11, wherein the control unit is further configured to combine measurement values acquired during a selection of the measurement intervals into a common measurement interval for evaluation.

19. The microscope system of claim 11, wherein the microscope system is configured to operate in a fluorescence correlation spectroscopy mode.

20. The microscope system of claim 19, wherein the fluorescence correlation spectroscopy mode is implemented as an Airy scan fluorescence correlation spectroscopy.

\* \* \* \* \*